United States Patent

Tomikawa et al.

[11] 3,940,811
[45] Mar. 2, 1976

[54] LIGHTWEIGHT CONSTRUCTION MATERIALS AND ARTICLES MADE THEREOF

[75] Inventors: Masami Tomikawa, Chiba; Hiroyuki Ishitobi, Tokyo; Hideo Ohkawa, Chiba, all of Japan

[73] Assignee: Idemitsu, Kosan Kabushiki-Kaisha (Idemitsu Kosan Co., Ltd.), Tokyo, Japan

[22] Filed: July 16, 1973

[21] Appl. No.: 379,493

[30] Foreign Application Priority Data
July 17, 1972 Japan.......................... 47-83369[U]

[52] U.S. Cl..................... 5/361 R; 5/355; 428/131; 428/179; 428/310; 428/315
[51] Int. Cl.².................... A47C 27/15; A47C 27/22
[58] Field of Search ........... 161/125, 130, 131, 116, 161/159, 160; 156/209; 260/2.5 H, 2.5 AK, 42.46; 5/337, 338, 345 R, DIG. 2, 355, 361 R; 428/131, 179, 310, 315

[56] References Cited
UNITED STATES PATENTS

| | | | |
|---|---|---|---|
| 2,898,975 | 8/1959 | Wagner.................................. | 5/337 |
| 3,203,921 | 8/1965 | Rosenfelder...................... | 260/42.46 |
| 3,323,152 | 6/1967 | Lerman................................ | 5/345 R |
| 3,525,663 | 8/1970 | Hale.................................... | 161/131 |
| 3,553,068 | 1/1971 | Coale................................... | 161/125 |
| 3,645,929 | 2/1972 | Normanton et al.............. | 260/2.5 R |
| 3,711,438 | 1/1973 | Susuki et al. .................... | 260/42.46 |
| 3,834,487 | 9/1974 | Hale.................................... | 161/131 |

Primary Examiner—George F. Lesmes
Assistant Examiner—Paul J. Thibodeau
Attorney, Agent, or Firm—William J. Daniel

[57] ABSTRACT

Lightweight construction materials having a low heat shrinking percentage and a high moisture permeability obtained by forming complementary concavoconvex patterns by means of press molding on both surfaces of a sheet of a foamed polyethylene type resin containing a relatively large amount of inorganic calcic filler, cushion made of said construction materials and mattress manufactured by laminating sheets of soft polyurethane foam on the lightweight construction material as core and covering the whole with cloth.

4 Claims, 3 Drawing Figures

LIGHTWEIGHT CONSTRUCTION MATERIALS AND ARTICLES MADE THEREOF

BACKGROUND OF THE INVENTION

This invention relates to novel lightweight construction materials possessing excellent properties.

Foamed polyethylene and polystyrene are suitable materials for shaping and are widely used as construction materials, furniture materials and packaging materials. On the other hand, sheets of plastics such as polyethylene and polystyrene processed to have complementary concavoconvex patterns on their both surfaces by means of press molding are widely used as buffering material.

However, materials having complementary concavoconvex patterns on both surface thereof (referred to hereinafter simply as materials having a core structure) have not yet been manufactured by press molding from foamed polyethylene or polystyrene sheets. This is ascribable to the reason that foamed plastics are poor in moldability and difficult to form the core structure therein, and even if the core structure were formed, the resulting material would not be processed to articles for practical use because of their high heat shrinking percentage and low moisture permeability.

As the results of many researches made for obtaining practically utilizable material having a core structure from foamed plastics, it has now been formed unexpectedly that a polyethylene type resin containing a relatively large amount of an inorganic calcic filler is excellent in moldability and is easily processed to have the core structure and that the resulting articles are low in heat shrinking percentage and high in moisture permeability. This invention has been accomplished on the basis of the above finding.

BRIEF SUMMARY OF THE INVENTION

Accordingly, it is an object of this invention to provide lightweight construction materials having a core structure made of foamed plastics.

It is another object of this invention to provide lightweight construction materials possessing low heat shrinking percentage and high moisture permeability.

It is still another object of this invention to provide easy cushion made of a foamed plastic material having a core structure.

It is further object of this invention to provide mattresses using said lightweight construction material as core material.

Other objects, features and advantages of this invention will be apparent from the following description taken in connection with the accompanying drawing wherein.

DETAILED DESCRIPTION OF THE INVENTION

Figure 1:
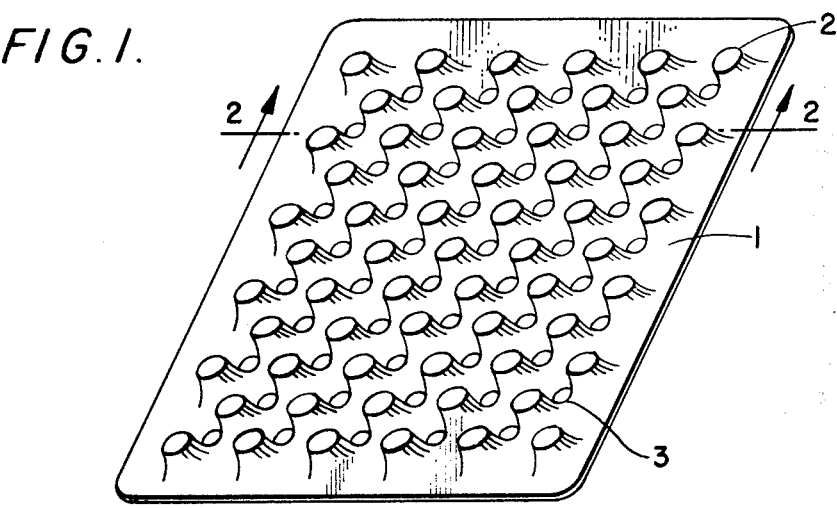
FIG. 1 is a perspective view of an example of the lightweight construction material of this invention.

By the term "complementary concavoconvex patterns" is meant herein a structure of a sheet having an alternate arrangement of a number of protuberances and recesses on each side in such manner that a protuberance is formed on one side where a recess is formed on the other side so that the sheet has a wavy sectional profile with a thickness.

The polyethylene type foamed resin constituting the lightweight construction material of this invention is obtained by adding a relatively large amount of an inorganic calcic filler together, if necessary, with a foaming agent and a bridging or cross-linking agent, to polyethylene, a copolymer of ethylene with the other comonomer or a polyblend composed predominantly of polyethylene and subjecting the admixture to foaming treatment. Utilizable as the inorganic calcic filler are fillers of inorganic compounds containing calcium as one of the essential components, for example, calcium carbonate, calcium sulfate, calcium silicate and calcium hydroxide, with calcium sulfite being particularly preferred. Said calcium sulfite shows excellent miscibility with polyethylene type resins and constitutes nuclei of effervescence in the process of manufacturing foamed body, thus serving to form a foamed body with minute and uniform cells. These fillers are generally in the form of powders having a particle size of 10 $\mu$ or less and are added to the resin at least in an amount of 30% by weight based on the total amount of the mixture. The foaming agent may be conventional ones such as azo-dicarboxylamide, diphenylsulfon-3,3-disulfohydrazide and benzylsulfonic diphenylhydrazide. As the bridging agent, organic peroxides such as ditertiary butyl peroxide, 1,3-bis(tert-butylperoxyisopropyl) benzene and dicumyl peroxide. If desired, other auxiliary additives such as lubricating agents and colorants may be added. These ingredients are mixed, milled sufficiently at a temperature of 90° – 150°C, charged into confined metal molds in a press molding machine and heated at a temperature of 180° – 200°C under pressure to produce a foamed body.

In general, a molded material in the form of a thick board is first prepared in such manner and then cut into several thin sheets to obtain the desired sheet materials.

For manufacturing the lightweight construction materials of this invention from the sheet materials, the latter is press molded, using a metal mold having a number of protuberances as male mold and a metal mold having a number of recesses corresponding to the protuberances as female mold. In the case of articles with a simple structure, this press molding operation may be performed even at room temperature. In the case of articles with a complicate structure or in the case of performing the molding operation more easily, however, the sheet material is preferably once heated with a heater to 100° – 150°C and then subjected to press molding. In this case, joint use of a vacuum molding method with a compressed air molding method serves to facilitate the molding operation further.

Figure 2:
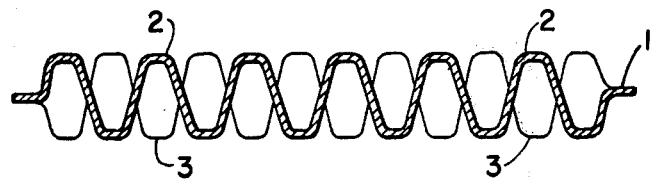
FIG. 2 is a sectional view of the material of FIG. 1 cut along the line A—A.

FIGS. 1 and 2 show examples of such lightweight construction materials. FIG. 1 is a perspective view of a lightweight construction material 1 and FIG. 2 is a sectional view of the material 1 cut along the line A—A in FIG. 1. This sectional view shows the complementary arrangement of protuberances 2 and recesses 3. The complementary concavoconvex pattern on the surface of the lightweight construction material may be spherical as shown in FIGS. 1 and 2 or may be cylindrical or cubic. The lightweight construction materials of this invention is very light in weight because of its small bulk density and exhibits excellent buffering, i.e., cushioning character. Also, it has such features as small coefficients of moisture and air permeability which could not been expected from the prior art material of this kind. Thus, it is suitable as buffering materials, construction materials such as wall material and ceiling material and various ornamental materials. Further, these materials can readily be ground, cut and processed for assembling. Furthermore, they have satisfactory bonding character and so are suitable as core material for composite panels.

On the other hand, cushions can easily be manufactured from foamed plastic materials having a core structure by laminating plural sheets of the lightweight construction material. Such cushions are very light in weight because of their small density and are easily bendable, thus making themselves suited as potable cushion. In addition, the cushion exhibits good cushioning property and warmth-maintaining property. Besides, finger-pressure therapeutic effects are obtained by virtue of the protuberances formed on the surface of the cushion, so that one can feel extreme comfortability on this cushion. As the cushion is excellent in water-resisting property, it can be used even in damp places. It is also a merit of the cushion that when it is incinerated as waste, incineration will be easy because of its small heat of combustion and little generation of toxic gases and soot.

It is possible to manufacture mattress from the lightweight construction material by laminating both surfaces of the material as core material with sheets of soft polyurethane foam and covering the laminate with cloth. For manufacturing the core material for such mattress, the sheet material is press molded, as in the case of manufacturing the lightweight construction material, by using a metal mold having a number of protuberances as male mold and a metal mold having a number of recesses corresponding to the protuberances as female mold. The resulting core material having the complementary concavoconvex patterns on both surfaces thereof is then punched by an adequate means such as borer. The punched holes give the mattress sufficient air permeability. As in the case of manufacturing the lightweight construction material, the press molding operation may be performed even at room temperature when the article to be manufactured has a simple structure. In the case of manufacturing articles with a complicate structure or in the case of performing the molding operation more easily, however, the sheet material is preferably once heated with a heater to 100° – 150°C and then subjected to press molding. As in the case of the lightweight construction material, joint use of a vacuum molding method with a compressed air molding method will serve to facilitate the operation. The resulting core material is then laminated on both surfaces thereof with sheets of soft polyurethane foam and the laminate is fixed with a conventional bonding agent such as a polyvinyl acetate emulsion adhesive.

The laminate is finally coated with cloth to form mattress.

Figure 3:
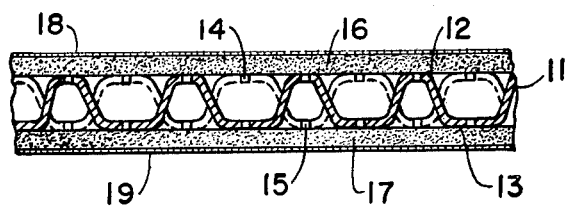
FIG. 3 is a longitudinal sectional view of an example of mattresses using the lightweight construction material as core material.

FIG. 3 is a sectional view showing an example of such mattress wherein the lightweight construction material 11 has punched holes 14 and 15 on the protuberance 12 and recess 13 thereof and laminated with sheets 16 and 17 of soft polyurethane foam and the whole laminate is covered with cloth cover 18 and 19.

This mattress using a foamed sheet of a specific material and structure has excellent air permeability, cushioning property, warmth-keeping property and touch. Besides, finger-pressure therapeutical effects are obtained by virtue of the protuberances formed on the surface of the core material, so that one can feel extremely comfortable on this mattress. Because of excellent restoring character the mattress retains its shape even after long and very frequent use. It is also a merit of the mattress that it is light in weight and can conveniently be transported. The cushioning character of this mattress consists of adequate rigidity and adequate flexibility unlike the prior art one, so that the mattress is not prone to incur such inconvenience as excessive sinking of the body in it. Such adequate rigidity is achieved by the use of the foamed polyethylene resin sheet having a special configuration, while said adequate cushioning property is attributable to the soft foamed polyurethane sheets laminated on both sides of the foamed polyethylene resin sheet.

It is an additional merit of the mattress that when it is incinerated as waste, such incineration will cause no environmental pollution because of its small heat of combustion and little generation of toxic gases and soot.

This invention will be understood more readily with reference to the following examples. However, these examples are intended to illustrate the invention and are not to be construed to limit the scope of the invention.

EXAMPLES

A mixture of 40 parts by weight of polyethylene, 60 parts by weight of calcium sulfite, 2.0 parts by weight of azo-dicarboxylamide and 0.2 part by weight of 1,3-bis(-tert-butyl peroxyisopropyl)benzene was heated for 12 minutes at 180° – 200°C under pressure of 30 kg/cm². The resulting foamed body was processed to sheets having various thickness and press molded to form sheets having a complementary concavoconvex pattern on both side thereof, using a molding machine having a heater with a Watt density of 3 W/cm². For the purpose of comparison, similar sheets were manufactured from polyethylene and polystyrene free from the inorganic filler. The press conditions and characteristics of the resulting sheets are shown in the table given below.

Table

| | Example | | | | | | | Comparative Example | |
|---|---|---|---|---|---|---|---|---|---|
| | No. 1 | No. 2 | No. 3 | No. 4 | No. 5 | No. 6 | No. 7 | Polyethylene | Polystyrene |
| Density (g/ml) | 0.193 | 0.193 | 0.193 | 0.193 | 0.193 | 0.193 | 0.193 | 0.038 | 0.024 |
| Press molding conditions | | | | | | | | | |
| Heating temperature (°C) | 140-150 | 140-150 | 140-150 | 140-150 | room temperature | room temperature | room temperature | 100-120 | 100-120 |
| Heating time (sec) | 70 | 75 | 120 | 180 | — | — | — | 60 | 10 |
| Molding time (sec) | 10 | 10 | 15 | 15 | 10 | 10 | 15 | 20 | 3 |

Table-continued

| | Example | | | | | | | Comparative Example | |
|---|---|---|---|---|---|---|---|---|---|
| | No. 1 | No. 2 | No. 3 | No. 4 | No. 5 | No. 6 | No. 7 | Polyethylene | Polystyrene |
| Density (g/ml) | 0.193 | 0.193 | 0.193 | 0.193 | 0.193 | 0.193 | 0.193 | 0.038 | 0.024 |
| Cooling time (sec) | 15–20 | 15–20 | 30–40 | 60–70 | — | — | — | 40–60 | 10–20 |
| Thickness of sample (mm) | 4 | 5 | 8 | 10 | 4 | 5 | 8 | 4 | 4 |
| Characteristics of the moldings | | | | | | | | | |
| Depth of core (mm) | 25 | 20 | 15 | 10 | 5 | 5 | 6 | 60–70 | 50–60 |
| Density (g/ml) | 0.190 | 0.192 | 0.188 | 0.186 | 0.211 | 0.219 | 0.215 | 0.049 | 0.031 |
| Heat shrinking percentage (%) | | | | | | | | | |
| Longitudinal direction | | | | | | | | | |
| 100°C | −2 | — | −1 | 0 | −6 | −6 | −4 | −10 | −10 |
| 120°C | −8 | — | −7 | −5 | −11 | −10 | −9 | −50 | −40 |
| Transverse direction | | | | | | | | | |
| 100°C | +4 | — | +2 | +2 | −6 | −5 | −4 | −4 | −20 |
| 120°C | +6 | — | −4 | −3 | −8 | −6 | −6 | −65 | −60 |
| Characteristics of the moldings | | | | | | | | | |
| Moisture permeability (g/m²/24hours) | 43.2 | 41.8 | 38.2 | 24.6 | 43.4 | 47.1 | 39.5 | 6.0 | 14.1 |

In the table, the heat shrinking percentage stands for difference in size in terms of percentage between the size of the original sample and the size of a sample treated at a given temperature for 22 hours and left for one hour at 23°C in a humidity of 50%, and the moisture permeability was measured according to JIS–Z–0208 under the conditions kept at 23°C for 24 hours in a humidity of 90%.

What is claimed is:

1. A mattress comprising an assembly of a core of a structural material having on each side thereof a flat sheet of soft resilient foam, said core comprising a sheet of a foamed mixture of polymer consisting essentially of an ethylene homopolymer or copolymer and at least about 30% up to about 60% by weight of a finely divided inorganic calcium compound having a particle size up to about 10μ, said sheet being deformed on its two opposite sides into a pattern of rows of alternating concavities and convexities with adjacent rows thereof being staggered relative to one another and the patterns on said opposite sides having a mating complementary configuration, the thickness of said sheet being less than the minimum extent of said concavities and convexities.

2. The mattress of claim 1 wherein said core has apertures extending through said sheet at the bottom and top respectively of said concavities and convexities in said pattern.

3. The mattress of claim 1 including an external fabric sheet on each side of said assembly.

4. The mattress of claim 1 wherein said flat foam sheet is formed of polyurethane.

* * * * *